UNITED STATES PATENT OFFICE.

HEINRICH LAUBMANN, OF HÖCHST-ON-THE-MAIN, GERMANY, ASSIGNOR TO THE FARBWERKE, VORMALS MEISTER, LUCIUS & BRÜNING, OF SAME PLACE.

DINITROANTHRACHRYSONE-DISULFONIC ACID AND METHOD OF MAKING SAME.

SPECIFICATION forming part of Letters Patent No. 569,419, dated October 13, 1896.

Application filed May 10, 1894. Serial No. 510,789. (Specimens.) Patented in Germany December 28, 1892, No. 70,806.

*To all whom it may concern:*

Be it known that I, HEINRICH LAUBMANN, a citizen of the Empire of Germany, residing at Höchst-on-the-Main, in the Empire of Germany, have invented certain new and useful Improvements in the Production of Dinitroanthrachrysone-Disulfonic Acid, (for which Letters Patent were granted to me in Germany, No. 70,806, dated December 28, 1892,) of which the following is a specification.

Anthrachrysone being treated with fuming sulfuric acid of ten to twenty per cent. at a temperature of from 100° to 120° centigrade transforms into a disulfonic acid which can quite easily be converted into a nitro product, the dinitroanthrachrysone-disulfonic acid. The production of this acid can be carried out by dissolving the free anthrachrysone-disulfonic acid in concentrated sulfuric acid and converting the same by nitration in the usual manner into the dinitro acid. A more simple way for its production is starting from the anthrachrysone, converting the same into the disulfonic acid by means of fuming sulfuric acid and nitrating this acid without previous insulating.

The production of the nitrosulfonic acid from anthrachrysone may, for example, be carried out in the following manner: Anthrachrysone is sulfonized with its from four to five fold quantity by weight of fuming sulfuric acid from ten to twenty per cent, anhydrid at about 100° centigrade up to being soluble in water. The sulfonation mixture after cooling down is diluted with about the equal volume of sulfuric acid of 66° Baumé and while stirring well is caused slowly to flow into the quantity of nitric acid demanded by theory for two nitro groups, best in the form of nitrating acid. When the nitric acid has been added, the mixture is heated to about 80° centigrade for a short time, and after cooling down again it is poured upon ice, the solution boiled up, and filtered. The dinitroanthrachrysone-disulfonic acid separates. It is removed by filtrating, and the nitrosulfonic acid remaining in the filtrate recovered by precipitating by means of common salt. By precipitating with concentrated hydrochloric acid and washing with somewhat diluted hydrochloric acid it may be purified.

When the nitroanthrachrysone-disulfonic acid is to be produced from the free anthrachrysone-disulfonic acid, the same is dissolved in from ten to fifteen fold its quantity by weight of concentrated sulfuric acid of 66° Baumé and the quantity of nitric acid demanded by theory, best in form of nitrating acid, caused slowly to flow into it while stirring well. The reaction mass is then treated with nitrosulfonic acid insulated and purified in manner like described in the preceding example.

The free anthrachrysone-disulfonic acid is in form of a greenish-yellow crystalline powder of easy solubility in water and alcohol, but very difficultly soluble in glacial acetic acid, and may be crystallized from this solution. Heated above 230° centigrade the acid undergoes rather impetuous decomposition.

In alkalies the dinitroanthrachrysone-disulfonic acid dissolves with red color. From this solution diluted acids precipitate an acid sodium salt which crystallizes from water in the form of beautiful gold-yellow leaflets.

The analysis gave numbers corresponding to those demanded by the formula:

| | Found. | Calculated for $C_{14}H_4O_6(NO_2)_2(SO_3Na)_2H_2O$ |
|---|---|---|
| Na | 7.64 | 7.8 pr. |
| S | 10.8 | 10.9 pr. |
| N | 4.7 | 4.8 pr. |

The salts formed with alkaline earths and heavy metals are precipitated from the solutions of the nitrosulfonic acid or of its sodium salt by the corresponding metallic-salt solutions in the form of precipitates, being most of them insoluble or difficultly soluble.

The dinitroanthrachrysone-disulfonic acid, as well as its salts, are to be employed as coloring-matters, and also as primary materials for the production of other coloring-matters, as fully described and claimed in my application filed December 26, 1893, Serial No. 494,750. It will only be necessary to state herein that when the dinitroanthrachrysone-disulfonic acid is treated with reducing agencies, such as iron, zinc, &c., in an acid solution, and subsequently boiled with alkalies, a blue coloring-matter is derived of varying shades, ranging from deep blue to violet.

What I claim as my invention is—

1. The process of producing dinitroanthrachrysone-disulfonic acid, which consists in sulfonizing anthrachrysone, and nitrating the sulfonation product, substantially as described.

2. As a new article of manufacture, dinitro-anthrachrysone-disulfonic acid having the following characteristics: being easily soluble in water and alcohol, quickly soluble in ether, benzin, chloroform and glacial acetic acid, undergoing rapid decomposition on being heated above 230° centigrade, soluble in alkalies with reddish color, its sodium salts crystallizing from water in the form of gold-yellow leaflets which on analysis give numbers corresponding to the formula $$C_{14}H_4O_6(NO_2)_2(SO_3Na)_2H_2O.$$

In testimony that I claim the foregoing as my invention I have signed my name in presence of two subscribing witnesses.

HEINRICH LAUBMANN.

Witnesses:
JOSEF REVERDY,
HEINRICH HAHN.